United States Patent
Iwasaki

(10) Patent No.: US 7,636,181 B2
(45) Date of Patent: Dec. 22, 2009

(54) IMAGE READING APPARATUS AND IMAGE FORMING APPARATUS

(75) Inventor: Takeshi Iwasaki, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1156 days.

(21) Appl. No.: 11/002,195

(22) Filed: Dec. 3, 2004

(65) Prior Publication Data

US 2005/0128534 A1 Jun. 16, 2005

(30) Foreign Application Priority Data

Dec. 12, 2003 (JP) .............................. 2003-414202
Oct. 27, 2004 (JP) .............................. 2004-312734

(51) Int. Cl.
*H04N 1/04* (2006.01)
(52) U.S. Cl. ....................... 358/483; 358/482; 358/474; 358/496
(58) Field of Classification Search ................. 358/483, 358/482, 514, 513, 512, 487, 506, 496, 497, 358/474; 250/208.1, 216, 239, 234–236; 399/211, 212; 382/312, 318, 319
See application file for complete search history.

(56) References Cited

U.S. PATENT DOCUMENTS

| | | | | |
|---|---|---|---|---|
| 4,742,240 A | * | 5/1988 | Yamanishi et al. ........... | 358/300 |
| 4,999,484 A | * | 3/1991 | Kaneko .................... | 250/208.1 |
| 5,003,380 A | * | 3/1991 | Hirota ........................ | 358/500 |
| 5,075,539 A | | 12/1991 | Shiraishi | |
| 6,185,403 B1 | | 2/2001 | Toyoshima et al. | |
| 6,536,679 B2 | | 3/2003 | Baeuerle et al. | |
| 2006/0087704 A1 | * | 4/2006 | Hirayama ................... | 358/474 |

FOREIGN PATENT DOCUMENTS

| | | |
|---|---|---|
| EP | 0 567 179 A1 | 10/1993 |
| EP | 0 576 735 A1 | 1/1994 |
| JP | 63-11462 | 1/1988 |
| JP | 63-88403 | 6/1988 |
| JP | 4-91463 | 8/1992 |
| JP | 4-223659 | 8/1992 |
| JP | 5-336301 | 12/1993 |
| JP | 2572307 | 10/1996 |
| JP | 2000-86020 | 3/2000 |
| JP | 2002-137438 | 5/2002 |
| JP | 2003-8831 | 1/2003 |

* cited by examiner

*Primary Examiner*—Cheukfan Lee
(74) *Attorney, Agent, or Firm*—Oblon, Spivak, McClelland, Maier & Neustadt, P.C.

(57) ABSTRACT

In an image reading apparatus, a plurality of reading sensors extend in a main scanning direction and separated from each other in the main scanning direction so as to be located in a staggered arrangement in which a part of one of the reading sensors in the longitudinal direction faces a part of adjacent one of the reading sensors in a sub-scanning direction. A first connection member is provided to the part of one of the reading sensors facing the part of the adjacent one of the reading sensors. The first connection member protrudes toward the adjacent one of the reading sensors. A second connection member is provided to the part of the adjacent one of the reading sensors facing the part of the one of the reading sensors. The second connection member protrudes toward the one of the reading sensors. The first and second connection members are brought into contact with each other by being urged by a spring.

14 Claims, 8 Drawing Sheets

IMAGE READING APPARATUS AND IMAGE FORMING APPARATUS

BACKGROUND OF THE INVENTION

1. Field of the Invention

The present invention generally relates to image forming techniques and, more particularly, to an image forming apparatus such as a copy machine, a printer, a facsimile machine, etc., and an image reading apparatus that is mounted on such an image forming apparatus.

2. Description of the Related Art

Generally, as a reading means (reading sensor) used for an image reading apparatus, there is a method of reading an original document S by a reading sensor 101 having a length covering an entire width of the original document S such as shown in FIG. 1A and suggested in Japanese Laid-Open Patent Application No. 2003-8831. This method of reading can easily acquire a high-quality image, but there is a problem in that a length covering the entire width of the original document S is required for the reading sensor 101, which increases a cost of the reading sensor 101.

In order to solve the above-mentioned problem, there is suggested, as shown in FIG. 1B, a reading arrangement in which a plurality of reading sensors 101 are located in a staggered arrangement so as to shorten the length of each of the reading sensors 101 to reduce a cost of the reading sensor.

It should be noted that, besides the reading sensor arrangement mentioned above, there is an image reading arrangement, such as shown in FIG. 1C, in which a reducing lens 105 is arranged between a contact glass and each of the image reading sensors 101.

Although the method shown in FIG. 1B can reduce a cost and also reduce an image reading apparatus, there are problems in that positions of the reading sensors tends to shift due to thermal expansion and complex image processing must be applied such as an image synthesizing process after an image is read by each reading sensor.

In order to solve such a problem, there is suggested an image reading apparatus suggested in Japanese Laid-Open Patent Application No. 5-336301. The image reading apparatus disclosed in this patent document has a structure in which image sensors located in a staggered arrangement on a base member are movably supported by a spacer in a longitudinal direction and adjacent two image sensors are connected to each other by a connection member. For this reason, even if a base member expands and contracts due to changes in an environmental temperature, a positional relationship between ends of the two image sensors adjacent to each other, thereby preventing a shift in the read image due to the changes in the environmental temperature.

However, since the image reading apparatus disclosed in Japanese Laid-Open Patent Application No. 5-336301 uses adhesive or screws to fix the reading sensors to the connection member, positions of the reading sensors may be shifted, when fixing the reading sensors, due to an external force during a screw-fixing operation or a contraction of an adhesive during a curing process, which may result in a shift in an image read by the thus-fixed read sensors.

Moreover, since an adjustment is needed to accurately arrange the reading sensors before fixing the reading sensors to the connection member, there is a problem in that an adjusting mechanism for accurately positioning the reading sensors becomes complicated.

SUMMARY OF THE INVENTION

It is a general object of the present invention to provide an improved and useful image reading apparatus and image forming apparatus in which the above-mentioned problems are eliminated.

A more specific object of the present invention is to provide an image reading apparatus and an image forming apparatus, which can improve an image quality with a simple structure.

In order to achieve the above-mentioned objects, there is provided according to one aspect of the present invention an image reading apparatus for converting an image of an original document into image data, the image reading apparatus comprising: a plurality of reading sensors each of which extends in a main scanning direction and separated from each other in the main scanning direction so as to be located in a staggered arrangement in which a part of one of the reading sensors in the longitudinal direction faces a part of adjacent one of the reading sensors in a sub-scanning direction perpendicular to the main scanning direction; a first connection member provided to the part of one of the reading sensors facing the part of the adjacent one of the reading sensors, the first connection member protruding toward the adjacent one of the reading sensors; a second connection member provided to the part of the adjacent one of the reading sensors facing the part of the one of the reading sensors, the second connection member protruding toward the one of the reading sensors, wherein the first connection member and the second connection member are brought into contact with each other by being urged by a first urging member.

According to the above-mentioned invention, the first connection member of one of the reading sensors and the second connection member of another one of the reading sensors facing the one of the reading sensors are contacted and pressed against each other by the first urging member so that the reading sensors are integrated with each other with the first and second connection members therebetween. Thus, since the boundary between reading regions of the reading sensors corresponds to the contact position between the first and second connection member, even if a thermal expansion occurs in the reading sensors due to changes in an environmental temperature, a change hardly occurs in a positional relationship between the reading sensors, and the reading sensors are prevented from being shifted from each other. Thus, the image reproduced from image data generated by the reading sensors is prevented from having an image misalignment or image chipping due to a change in the positional relationship between the reading sensors. Consequently, an improvement in the image quality can be achieved.

Additionally, since the first and second connection members, which are urged against each other by the first urging member, are used to integrate the reading sensors with each other, a change in the positional relationship is smaller than that of a case where the reading sensors are fixed to each other by adhesive or screws. Therefore, the image reproduced from image data generated by the reading sensors is prevented from having an image misalignment or image chipping due to a change in the positional relationship between the reading sensors caused by an external force when attaching the reading sensors, thereby improving the image quality.

Additionally, since the first and second connection members are pressed against each other by the first urging member, a construction of the image reading apparatus can be simplified, and the attachment of the reading sensors can be easily performed.

Further, since the first and second connection members are pressed against each other by the first urging member, a position adjustment of the reading sensors in the sub-scanning direction and a pint adjustment with respect to the surface of the original document can be performed after mounting the reading sensors in the main scanning direction.

In the image reading apparatus according to the present invention, the first connection member and the second connection member may be integrated with respective one of the reading sensors. Since the first and second connection members are integrated with the respective reading sensors, the structures of the reading sensors can be simplified.

In the image reading apparatus according to the present invention, the first connection member and the second connection member may be are fixed to respective one of the reading sensors by a fixing means. Accordingly, by forming the first and second connection members by a material having a coefficient of thermal expansion smaller than the material of the reading sensor, a shift of the boundaries between the reading sensors hardly occurs and a change in the positional relationship between the reading sensors hardly occurs.

In the image reading apparatus according to the present invention, a position at which the first connection member and the second connection member are in contact with each other may coincide with a boundary line between reading regions of adjacent ones of the reading sensors. Accordingly, the position of the boundary does not shift and there is a change hardly occurs in the positional relationship between the reading sensors even if there is a difference between the coefficient of thermal expansion of the material of the first and second connection members and the coefficient of thermal expansion of the material of the reading sensors (especially, sensor boards).

In the image reading apparatus according to the present invention, one of the first and second connection members may have a cylindrical member that contacts with a contact and press part of the other of the first and second connection members. Accordingly, since the cylindrical member is brought into contact with one of the first and second connection members, movement at the contact point can be smoother than a case where the first and second connection members contact with each other at a surface, which facilitates a position adjustment of the reading sensors after mounting the reading sensors.

The image reading apparatus according to the present invention may further comprise: a base part that supports the reading sensors; and a plurality of support parts that connect the reading sensors with the base part, wherein the support parts rotatably support the reading sensors relative to the base part so that positions of the reading sensors are adjustable in both the main scanning direction and the sub-scanning direction. Accordingly, the reading sensors are movable in response to elongation caused by thermal expansion of the reading sensors due to changes in an environmental temperature, thereby preventing deformation of the reading sensors. Additionally, since the reading sensors are supported at positions adjustable also in the sub-scanning direction, the positions of the reading sensors can be adjusted after the reading sensors are mounted to the base part.

The image reading apparatus according to the present invention may further comprise: a base part rotatably supporting the reading sensors; a plurality of second urging members that urge the reading sensors toward the base part; and adjusting members that press the reading sensors against urging forces of the second urging members so as to adjust positions of the reading sensors. Since the adjusting members, such as adjusting screws, pressing the reading sensors in the upward or downward direction against the urging force are provided, a pint adjustment can be performed by rotating the reading sensors by operating the adjusting members even after the reading sensors are mounted to the base part.

Additionally, there is provided according to another aspect of the present invention an image forming apparatus comprising: an image forming mechanism that forms an image on a recording medium in accordance with image data supplied thereto; and an image reading apparatus for converting an image of an original document into the image data, wherein the image reading apparatus including: a plurality of reading sensors each of which extends in a main scanning direction and separated from each other in the main scanning direction so as to be located in a staggered arrangement in which a part of one of the reading sensors in the longitudinal direction faces a part of adjacent one of the reading sensors in a sub-scanning direction perpendicular to the main scanning direction; a first connection member provided to the part of one of the reading sensors facing the part of the adjacent one of the reading sensors, the first connection member protruding toward the adjacent one of the reading sensors; a second connection member provided to the part of the adjacent one of the reading sensors facing the part of the one of the reading sensors, the second connection member protruding toward the one of the reading sensors, wherein the first connection member and the second connection member are brought into contact with each other by being urged by a first urging member.

According to the above-mentioned invention, the first connection member of one of the reading sensors and the second connection member of another one of the reading sensors facing the one of the reading sensors are contacted and pressed against each other by the first urging member so that the reading sensors are integrated with each other with the first and second connection members therebetween. Thus, since the boundary between reading regions of the reading sensors corresponds to the contact position between the first and second connection member, even if a thermal expansion occurs in the reading sensors due to changes in an environmental temperature, a change hardly occurs in a positional relationship between the reading sensors, and the reading sensors are prevented from being shifted from each other. Thus, the image reproduced from image data generated by the reading sensors is prevented from having an image misalignment or image chipping due to a change in the positional relationship between the reading sensors. Consequently, an improvement in the image quality can be achieved.

Additionally, since the first and second connection members, which are urged against each other by the first urging member, are used to integrate the reading sensors with each other, a change in the positional relationship is smaller than that of a case where the reading sensors are fixed to each other by adhesive or screws. Therefore, the image reproduced from image data generated by the reading sensors is prevented from having an image misalignment or image chipping due to a change in the positional relationship between the reading sensors caused by an external force when attaching the reading sensors, thereby improving the image quality.

Additionally, since the first and second connection members are pressed against each other by the first urging member, a construction of the image reading apparatus can be simplified, and the attachment of the reading sensors can be easily performed.

Further, since the first and second connection members are pressed against each other by the first urging member, a position adjustment of the reading sensors in the sub-scanning direction and a pint adjustment with respect to the surface of the original document can be performed after mounting the reading sensors in the main scanning direction.

Other objects, features and advantages of the present invention will become more apparent from the following detailed descriptions when read in conjunction with the accompanying drawings.

DETAILED DESCRIPTION OF THE PREFERRED EMBODIMENT

A description will be given, with reference to the drawings, of an embodiment of the present invention.

In the present embodiment, a copy machine will be explained as an example of an image forming apparatus equipped with an image reading apparatus according to the present invention. It should be noted that the present invention is applicable not only to a copy machine but also to other image forming apparatuses such as a printer, a facsimile machine, etc.

Figure 1A:
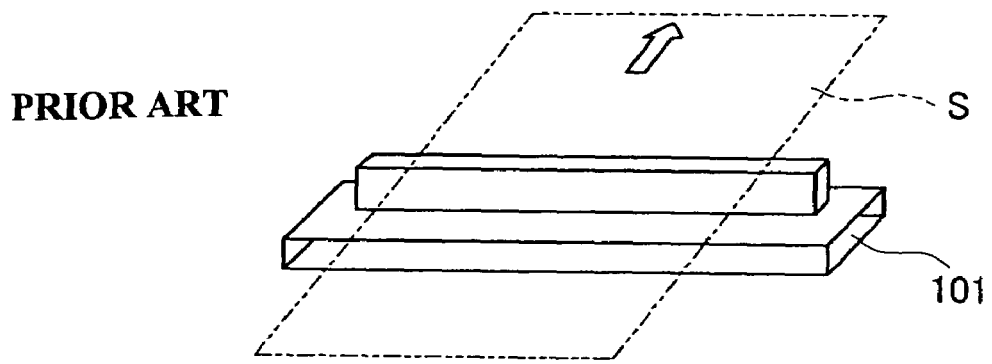
FIG. 1A is an illustration of a conventional image reading apparatus having a single reading sensor.
Figure 1B:
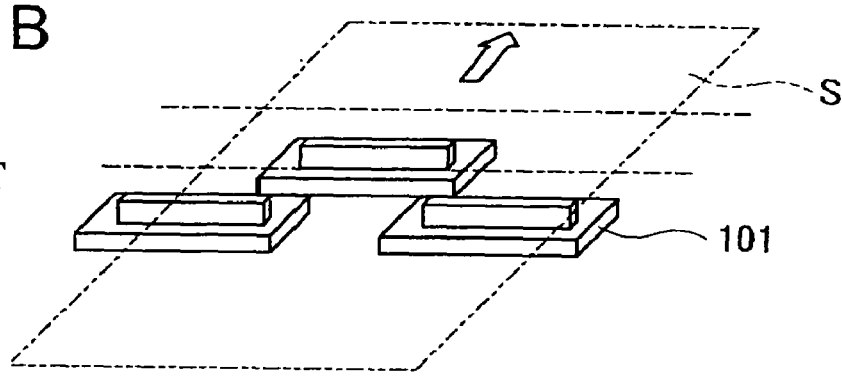
FIG. 1B is an illustration of a conventional image reading apparatus having a plurality of reading sensors.
Figure 1C:
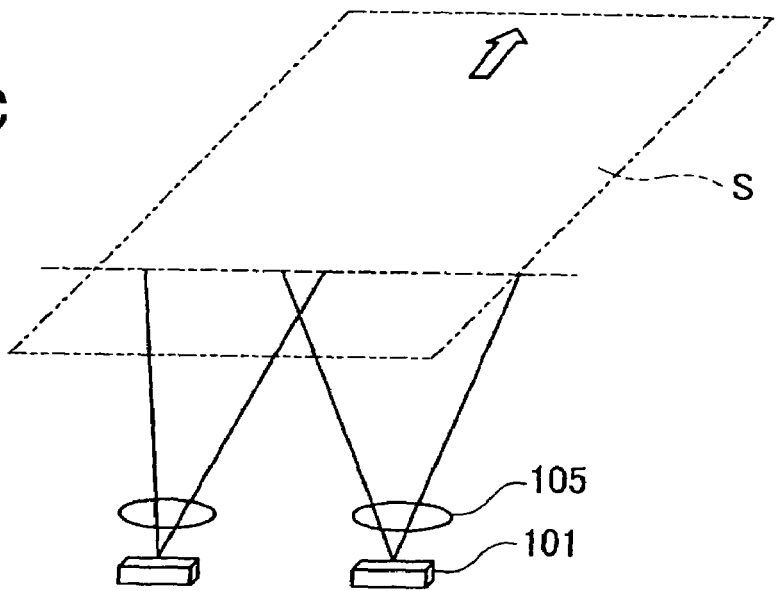
FIG. 1C is an illustration of a conventional image reading apparatus having a plurality of reading sensors with reducing lenses.
Figure 2:
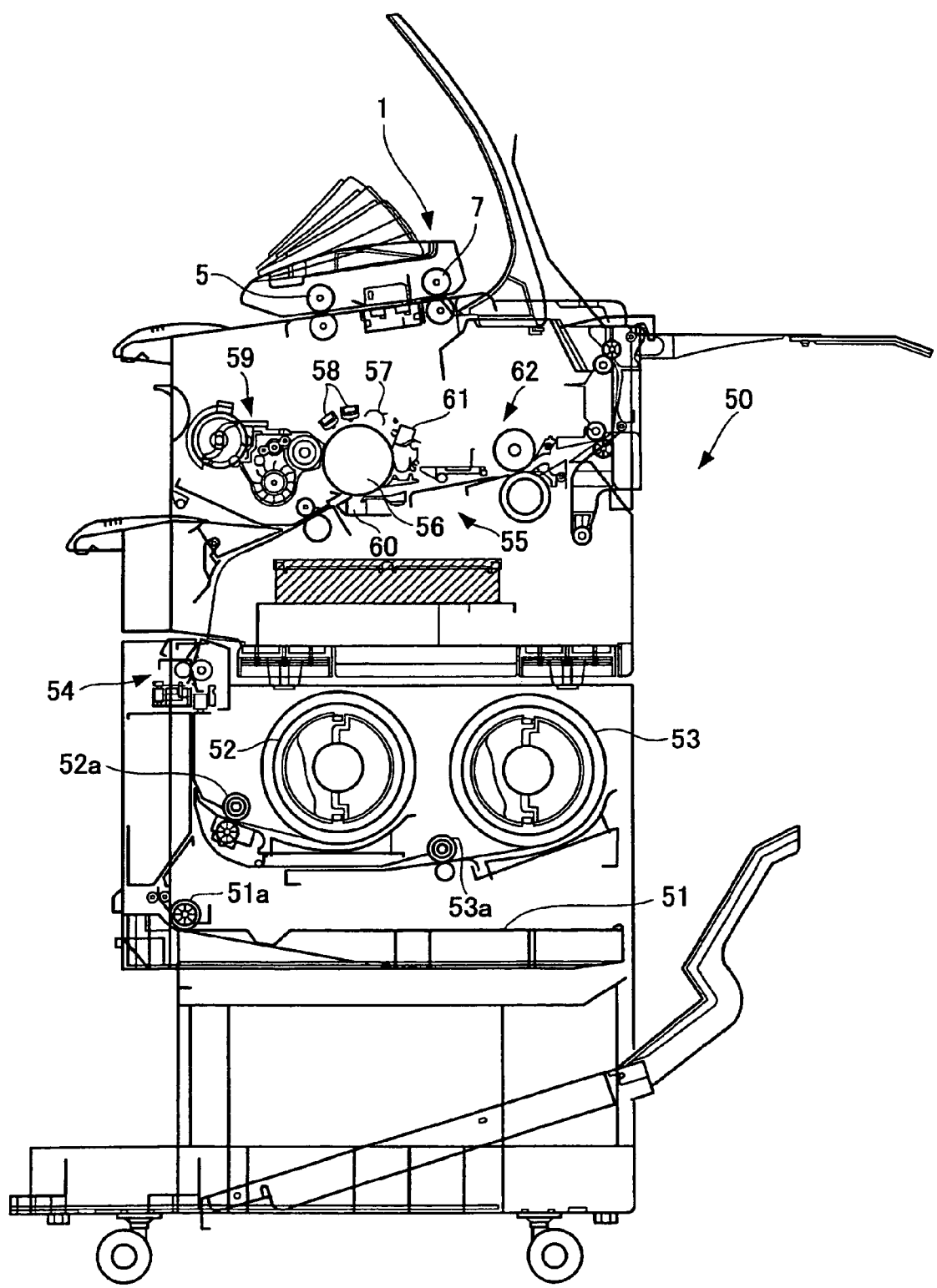
FIG. 2 is a side view of an copy machine according to an embodiment of the present invention.

FIG. 2 is a side view of a copy machine 50 according to an embodiment of the present invention. An image reading apparatus 1 is mounted in an upper portion of the copy machine 50. Provided in a lower portion of the copy machine 50 are a paper supply cassette 51, which contains sheet-like recording papers, and paper supply cassettes 52 and 53, which accommodate roll-like recording papers. The recording papers accommodated in the paper supply cassettes 51-53 are fed by paper supply rollers 51a, 52a and 53a, and, thereafter, conveyed to an image forming mechanism 55 located above the rollers by a conveyance roller 54.

The image forming mechanism 55 comprises: a photoconductor drum 56; a charge device 57, which electrically charges the photoconductor drum 56; an irradiation device 58 which irradiates image signal light onto the photoconductor drum 56 so as to form a latent image on the photoconductor drum 56; a development device 59, which applies a toner onto the photoconductor drum 56 so as to develop the latent image as a toner image; a transfer device 60, which transfers the toner image onto a recording paper; a cleaning device 61, which removes a residual toner on the photoconductor drum 56 after carrying out the transfer of the toner image onto the recording paper; and a fixing device 62, which fixes the toner image onto the recording paper.

Figure 3:
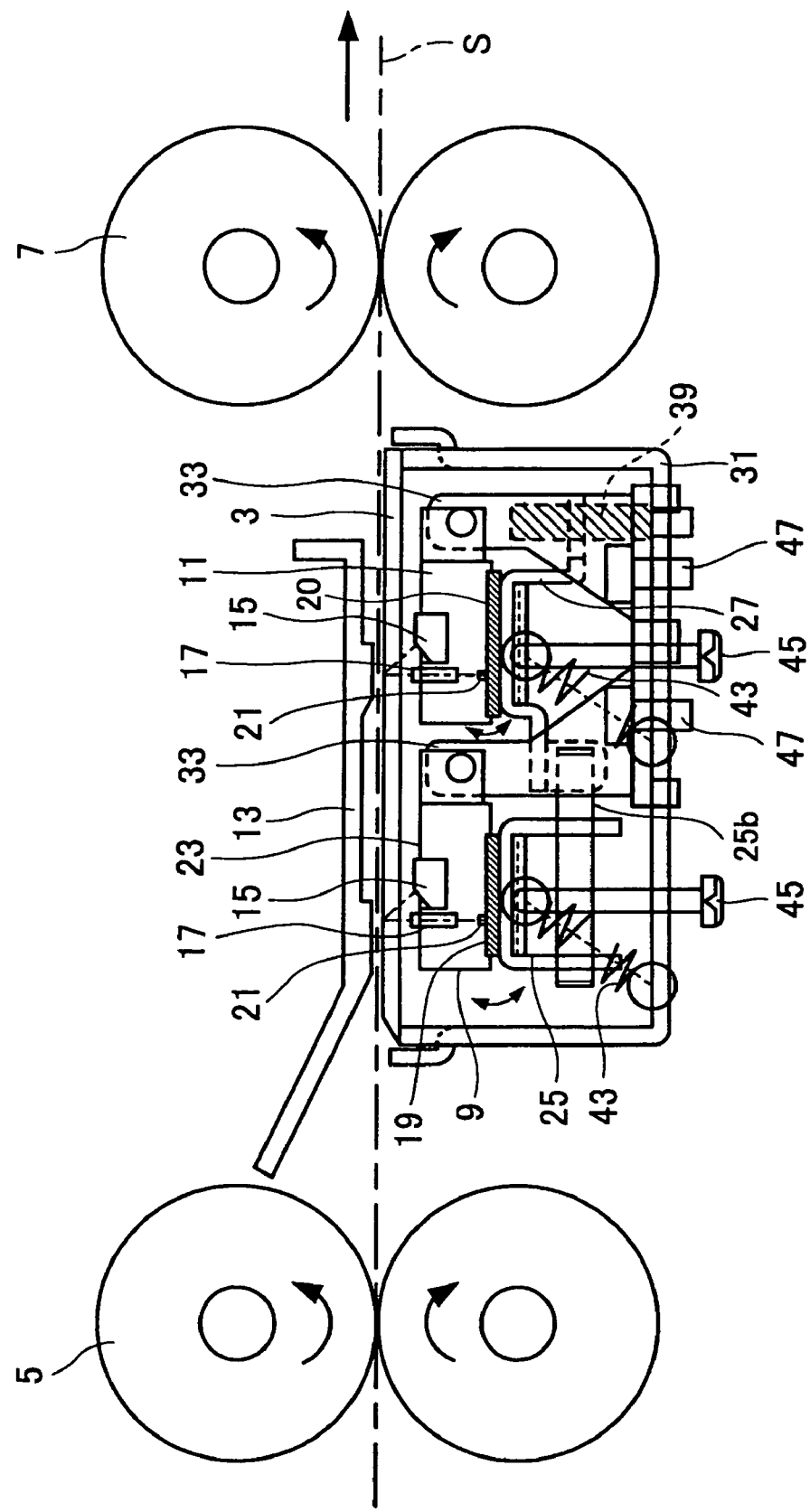
FIG. 3 is a cross-sectional view of an image reading apparatus shown in FIG. 2.

The image reading apparatus 1 comprises, as shown in FIG. 3: a pair of first conveyance rollers 5, which conveys an original document S, which is fed through an insertion opening, to a contact glass 3; first reading sensors 9 and a second reading sensor 11, which correspond to reading means to read an image of the original document S placed on the contact glass 3; a press board 13, which guides the original document S on the contact glass 3; and a pair of second conveyance rollers 7, which ejects the original document S of which image has been read in a direction opposite to the insertion opening.

The first reading sensors 9 (first reading means) read parts of the original document S, which is conveyed by the pair of first conveyance rollers 5, and the second reading sensor 11 (second reading means) reads the rest of the original document S other than the parts read by the first reading sensors 9.

The first reading sensors 9 are positioned on opposite sides in the main scanning direction on an upstream side so as to read opposite sides of the original document S, respectively. On the other hand, the second reading sensor 11 is located at a position away from the first reading sensors 9 on a downstream side by a predetermined distance and in a center portion in the main scanning direction so as to read the center portion of the original document S.

The first reading sensors 9 and the second reading sensor 11 are located in a staggered arrangement so that the longitudinal direction of each of the first and second sensors 9 and 11 extends along the main scanning direction and opposite ends of the second reading sensor 11 face the respective ends of the first reading sensors 9 in a sub-scanning direction.

An illumination lamp 15 is provided inside each of the first reading sensors 9 and second reading sensor 11. Each illumination lamp 15 irradiates a light of a predetermined intensity onto an image of the original document S. A light reflected by an image surface of the original document, which corresponds to the image pattern, is focused on a light-receiving element 21 at an equal magnification through a cellfox lens (imaging lens) 17. It should be noted that the illumination lamp 15, the cellfox lens 17 and a sensor board 19 or a sensor board 20 are supported by a housing 23.

The first reading sensors 9 and the second reading sensor 11 are provided in a box-like base part 31. A connection member (connection means) 25 is attached to an end of the sensor board 19 of each of the first reading sensors 9, and extends toward the second reading sensor 11. Additionally, a connection member 27 is attached to each end of the sensor board 20 of the second reading sensor 11 and extends toward the first reading sensors 9.

A description will be given, with reference to FIG. 6, of a specific configuration of the connection members 25 and 27. Hereinafter, the connection member 25 is referred to as a first connection member, and the connection member 27 is referred to as a second connection member.

Figure 6:
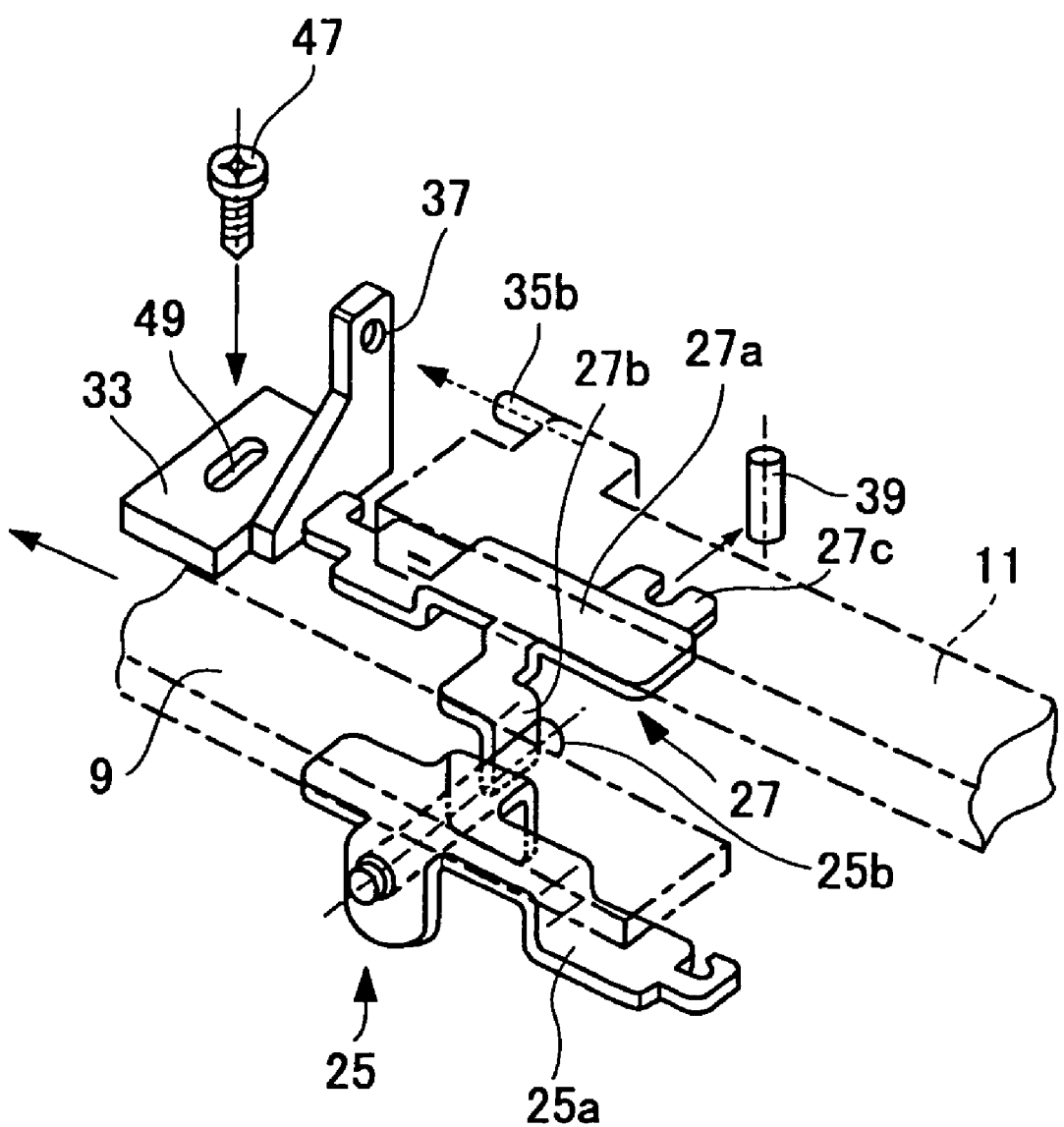
FIG. 6 is a perspective view of connection members shown in FIG. 4.

In FIG. 6, the first connection member 25 comprises a main body 25a and a pin (cylindrical member) 25b that is rotatably supported by the main body 25a and extends toward the second connection member. The first connection member 25 is formed of a metal having a coefficient of thermal expansion smaller than that of the sensor board 19.

The second connection member 27 comprises a main body 27a, a contact and press part 27b that contacts and presses the pin 25b of the first connection member 25, and an engaging tab 27c that is engaged with a positioning pin 39 protruding from a base part 31. The second connection member 27 is formed of a metal having a coefficient of thermal expansion smaller than that of the sensor board 20.

Figure 4:
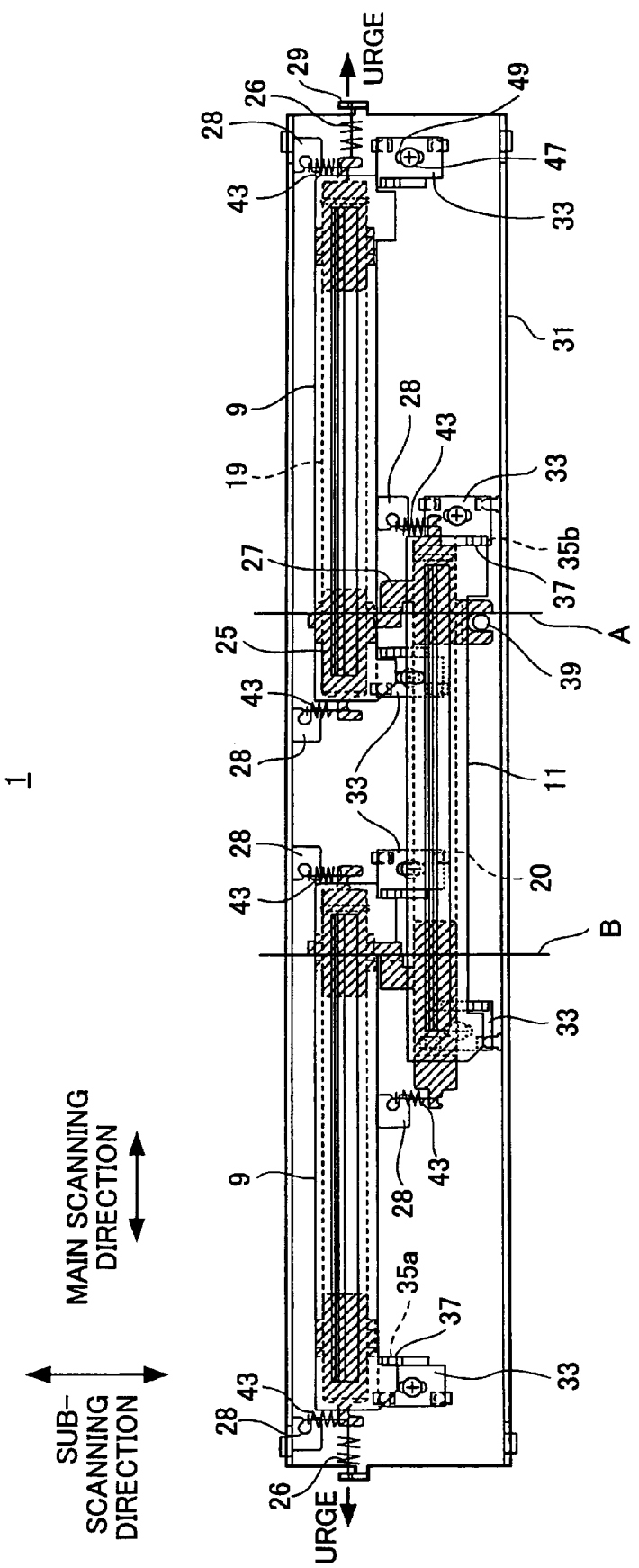
FIG. 4 is a side view of the image reading apparatus.

A position at which the contact and press part 27b of the second connection member 27 is pressed against the pin 25b of the second connection member 25 coincides with a boundary (indicated by lines A and B in FIG. 4) between a reading region of the first reading sensor 9 and a reading region of the second reading sensor 11. The contact and press part 27b and the pin 25b are pressed against each other in the main scanning direction. It should be noted that the first and second connection members 25 and 27 are hatched in FIG. 4.

Additionally, a first spring (first urging member or first urging means) 26 is provided between an end of the sensor board 19 and a bracket 29 provided on the base part 31. The first spring 26 urges the first reading sensor 9 outward in the main scanning direction. Accordingly, the first connection member 25 is pressed against the second connection member 27 in the primary scanning direction.

Second springs (second urging member or second urging means) 43 are provided between brackets 28 provided to the base part 31 and each of opposite ends of the sensor boards 19 and 20. The second springs 43 urges the first reading sensors 9 and the second reading sensor 11 in a direction of rotation about the main scanning direction. It should be noted that the first springs 26 and the second springs 43 are fixed to the sensor board 19 or the sensor board 20.

Adjusting screws 45 (adjusting members; refer to FIGS. 3 and 5) are provided to the base part 31. By being engaged with the adjusting screws 45, the first and second reading sensors 9 and 11 can be pressed upward against the urging force by the second springs 43, or can be rotated downward by urging the first and second reading sensors 9 and 11 by the urging force of the second springs 43. Accordingly, positioning of the first and second reading sensors 9 and 11 in the rotational directions can be achieved.

The first reading sensors 9 and the second reading sensor 11 are supported by support parts 33 provided to the base part 31. Specifically, the engaging tabs 27c of the second connection members 27 are engaged with respective a positioning pin 39 protruding from the base part 31. Reference pins 35a provided on opposite ends of each of the first reading sensors 9 and reference pins 35b provided to opposite ends of the second reading sensor 11 are engaged with respective engaging holes 37 formed in the support parts 33. Accordingly, a movement of the first and second reading sensors 9 and 11 in the sub-scanning Direction is restricted.

Moreover, the movement of the first and second reading sensors 9 and 11 in the main scanning direction is restricted by the positioning pin 39 protruding from the base part 31 being engaged with the engaging tabs 27c of the second connection member 27 of the second reading sensor 11.

Guide holes 49 are formed in bottom portions of the support parts 33 so that screws 47 are engaged with the base part 31 by being extended through the guide holes 49, respectively, and the support parts 33 are fixed to the base part 31. The guide holed 49 are formed to be elongated in the sub-scanning direction so that positions of the support parts 33 can be adjusted in the sub-scanning direction with respect to the base part 31.

Figure 8:
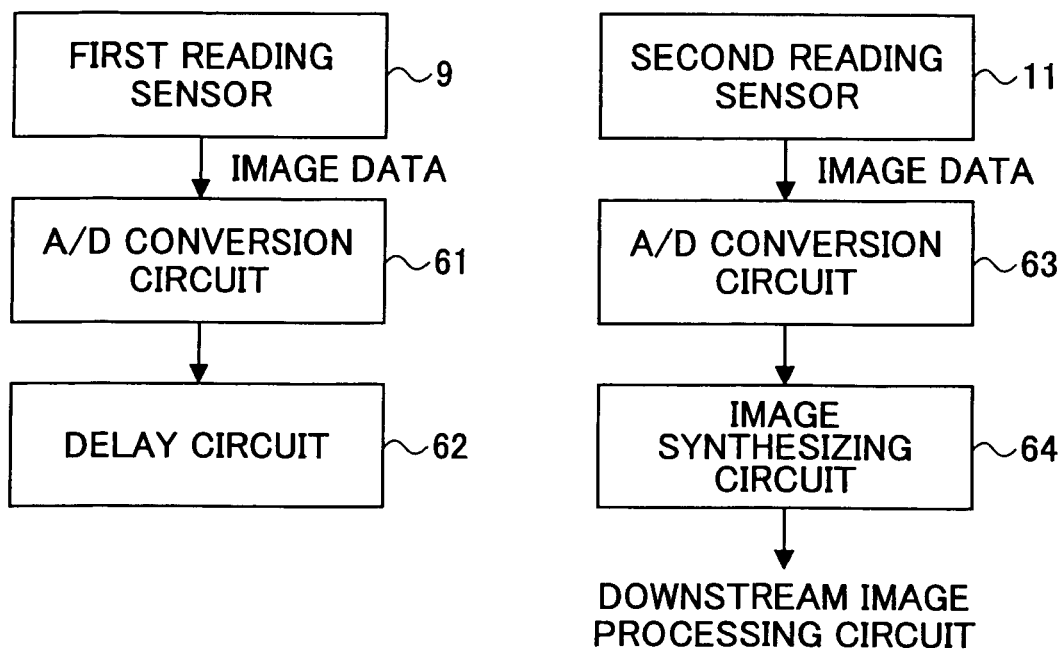
FIG. 8 is a block diagram of an image processing circuit provided in the image forming apparatus shown in FIG. 2.

As shown in FIG. 8, image data output from the first reading sensors 9 is converted from analog data to digital data by an A/D conversion circuit 61. Then, the digital data is temporary stored by a delay circuit 62 in a memory (not shown in the figure) for a predetermined period of time.

On the other hand, image data output from the first reading sensor 11 is converted from analog data to digital data by an A/D conversion circuit 63. Then the digital data is synthesized by an image synthesizing circuit 64 with the image data temporarily stored in the above-mentioned memory, and the synthesized image data is sent to an image processing circuit (not shown in the figure).

A description will now be given of an operation of the image reading apparatus 21 according to the present embodiment.

Figure 7:
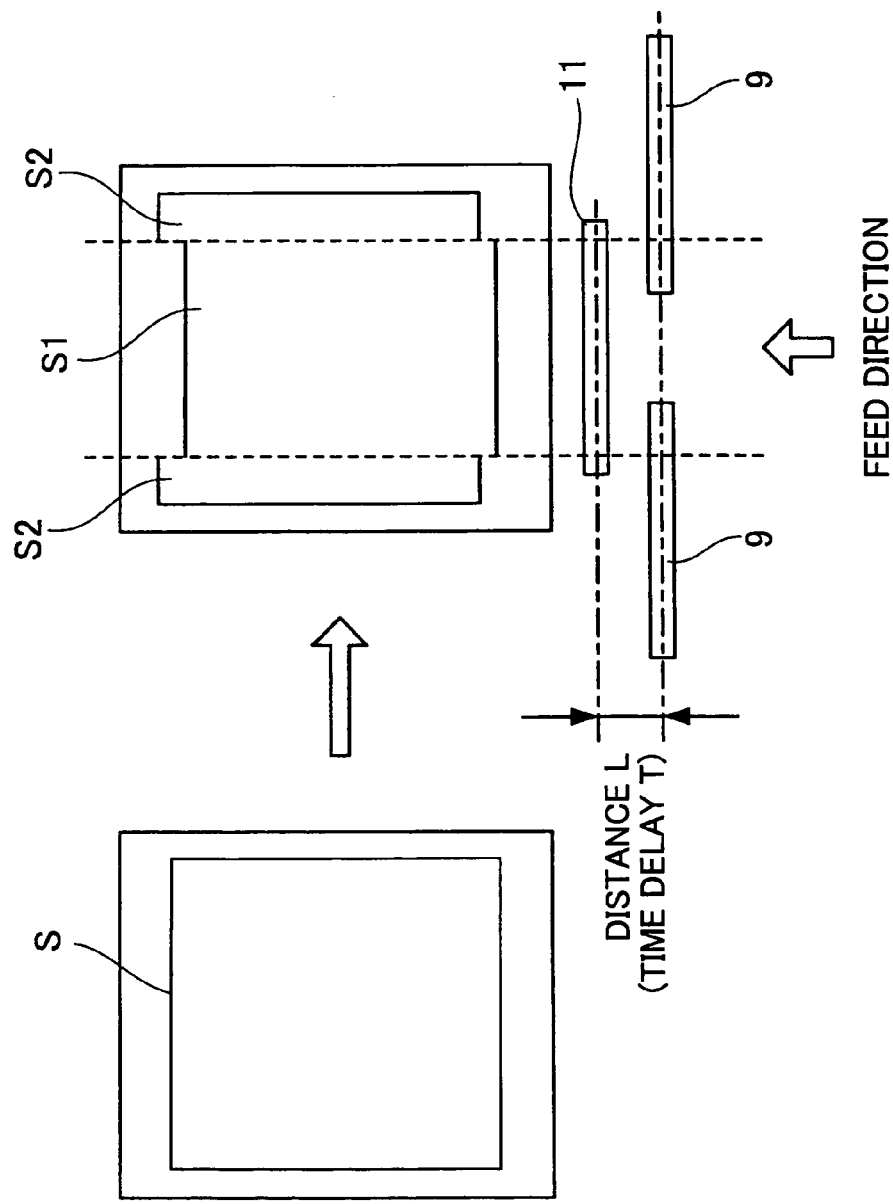
FIG. 7 is an illustration for explaining an operation of reading an original document.

The original document S inserted into the insertion opening is conveyed to a position above the contact glass 3 by the first conveyance rollers 5. As shown in FIG. 7, after the both side portions S2 of the original document S being conveyed are read by the first reading sensors 9, respectively, the center portion S1 of the original document S1 is read by the second reading sensor 11.

Image data generated by reading the original document S is converted from analog data to digital data by the A/D conversion circuit 61, and, thereafter, the image data is temporary stored by the delay circuit 62 in the memory. Image data generated by reading the original document by the second reading sensor 11 is converted from analog data to digital data by the A/D conversion circuit 63, and, thereafter, the image data is synthesized by the image synthesizing circuit 64 with the image data generated by the image reading sensors 9 and temporarily stored in the above-mentioned memory. Then, the synthesized image data is sent to the image processing circuit, and processed by the image processing circuit. Consequently, the image data from the first reading sensors 9 is synthesized with the image data from the second reading sensor 11 with alignment in the main scanning direction.

A description will now be given of a method of attaching the first reading sensors 9 and the second reading sensor 11 to the base part 31.

Figure 5:
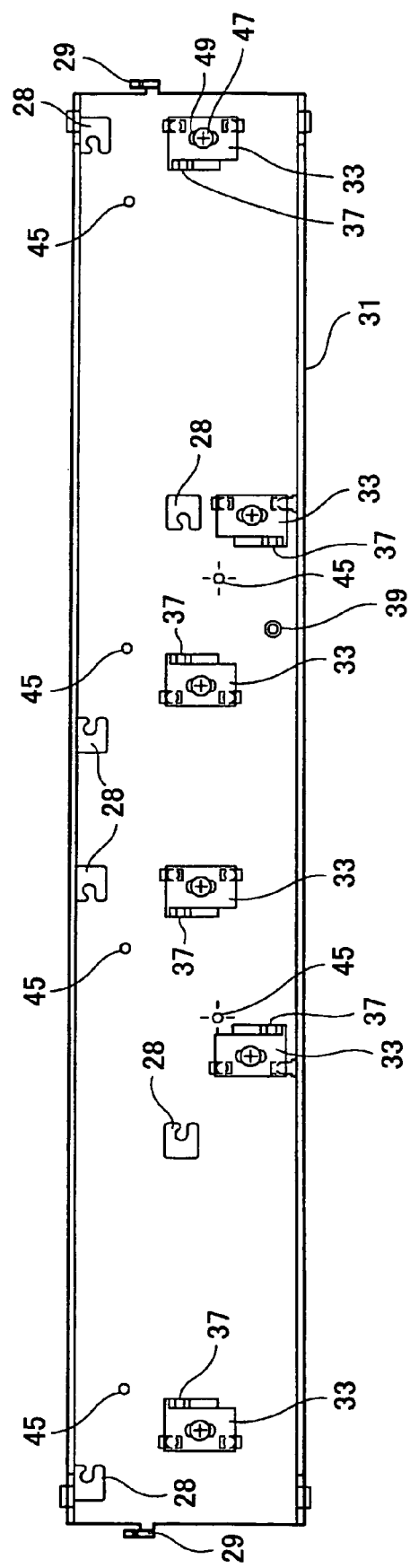
FIG. 5 is a side view of a base part shown in FIG. 4.

When attaching the first reading sensors 9 and the second reading sensor 11 to the base part 31 in a state shown in FIG. 5, the reference pins 35b are brought into engagement with the engaging holes 37 provided in the second reading sensor 11, respectively, and the engaging tab 27c is brought into engagement with the positioning pin 39 so as to position the second reading sensor 11 on the base part 31. Thereafter, the second springs 43 are attached to the brackets 28.

Subsequently, the reference pins 35a provided on the first reading sensors 9 are brought into engagement with the engagement holes 37 formed in the support parts 33 so as to position the first reading sensors 9 on the base part 31. Thereafter, the second springs 43 are attached to the respective brackets 29 and the first springs 26 are attached to the respective brackets 29.

At this time, the movement of the first reading sensors 9 and the second reading sensor 11 in the main scanning direction is restricted by the positioning pin 39 being brought into contact with the engaging tab 27c provided to one of the second connection members 27 of the second reading sensor 11.

Additionally, the first reading sensors 9 and the second reading sensor 11 are positioned in the main scanning direction by the pin 25b of the first connection member 25 being pressed against the contact and press part 27b of the second connection member 27 due to the first reading sensors 9 being urged outward in the main scanning direction by the first springs 26.

Moreover, when the first reading sensors 9 and the second reading sensor 11 are urged in the rotational direction by being urged by the second springs 43. Since the adjusting screws 45 are provided to the base part 31, positioning of the first and second reading sensors 9 and 11 can be performed by the adjusting screws 45 being engaged with an upper portion to move the first and second sensors 9 and 11 upward against the urging force of the second springs 43 or the adjusting screws 45 being engaged with a lower portion to rotate the first and second reading sensors 9 and 11 downward by the urging force by the second springs 43.

Additionally, since the guide holes 49 elongated in the sub-scanning direction are formed in the bottom portions of the support parts 33, positioning of the first reading sensors 9 and the second reading sensor 11 can be performed by the screws 47 being moved along the guide holes 49 and brought into engagement with the support parts 33.

As mentioned above, according to the present embodiment, the first connection members 25 of the first reading sensors 9 and the second connection members 27 of the second reading sensor 11 are contacted and pressed against each other so that the second reading sensor 11 and each of the first reading sensors 9 are integrated with each other with the first and second connection members 25 and 27.

Accordingly, the second reading sensor 11 and each of the first reading sensors 9 are connected via the first and second connection members 25 and 27. Thus, a change hardly occurs in the positional relationship between the second reading sensor 11 and each of the first reading sensors 9, and the second reading sensor 11 and each of the first reading sensor 9 are prevented from being shifted from each other. Thus, the image reproduced from image data generated by the first and second reading sensors 9 and 11 is prevented from having an image misalignment or image chipping due to a change in the positional relationship between the second reading sensor 11 and each of the first reading sensors 9. Consequently, an improvement in the image quality can be achieved.

Additionally, since the first and second connection members 25 and 27, which are urged against each other by the first springs 26, are used to integrate the first reading sensors 9 and the second reading sensor 11 with each other, a change in the positional relationship is smaller than that of a case where the second reading sensor 11 and each of the first reading sensors 9 are fixed to each other by adhesive or screws. Therefore, the image reproduced from image data generated by the first and second reading sensors 9 and 11 is prevented from having an image misalignment or image chipping due to a change in the positional relationship between the second reading sensor 11 and each of the first reading sensors 9, thereby improving the image quality.

Further, since the first and second connection members 25 and 27 are pressed against each other by the first springs 26, a construction of the image reading apparatus 1 can be simplified, and the attachment of the first and second reading sensors 9 and 11 can be easily performed.

Additionally, since the first and second connection members 25 and 27 are pressed against each other by the first springs 26, a position adjustment of the first and reading sensors 9 and 10 in the sub-scanning direction and a pint adjustment with respect to the surface of the original document can be performed after mounting the first and second reading sensors 9 and 11 in the main scanning direction.

Additionally, since the first and second connection members 25 and 27 are integrated with the respective first and second reading sensors 9 and 11, the structures of the first and second reading sensors 9 and 11 can be simplified. It should be noted that the first and second connection members 25 and 27 may be prepared as separate members so that the first and second connection members 25 and 27 are fixed to the respective first and second sensors 9 and 11 by fixing means such as a screw. In such a case, the first and second connection members 25 and 27 may be formed of a material having a coefficient of thermal expansion smaller than the material of the sensor boards 19 and 20 of the first and second reading sensors 9 and 11 so that a shift of the boundaries between the second reading sensor 11 and each of the first reading sensors 9 hardly occurs and a change in the positional relationship between the second reading sensor 11 and each of the first reading sensors 9 hardly occurs.

Further, in the present embodiment, since the positions at which the first and second connection members 25 and 27 contact with each other are located on the boundaries between the reading region of the second reading sensor 11 and the reading region of each of the first reading sensors 9, the positions of the boundaries do not shift and there is a change hardly occurs in the positional relationship between the second reading sensor 11 and each of the first reading sensors 9 even if there is a difference between the coefficient of thermal expansion of the material of the first and second connection members 25 and 27 and the coefficient of thermal expansion of the material of the first and second reading sensors 9 and 11 (especially, the sensor boards 19 and 20).

Further, in the present embodiment, since the pins 25b are provided to the first connection members 25 and the pins 25b are brought into contact with the contact and press parts 27b of the second connection members 27, movement at the contact points can be smoother than a case where the first and second connection members 25 and 27 contact with each other at surfaces, which facilitates a position adjustment of the first and second reading sensors 9 and 11 after mounting the first and second reading sensors 9 and 11.

Further, in the present embodiment, since the base part 31 supporting the first and second sensors 9 and 11 and the support parts 33 connecting the first and second reading sensors 9 and 11 to the base part 31 are provide so that the support parts 33 support the base part 31 and the first and second reading sensors 9 and 11 at positions adjustable in the main scanning direction and the sub-scanning direction, the first and second reading sensors 9 and 11 are movable in response to elongation caused by thermal expansion of the first and second reading sensors 9 and 11 due to changes in an environmental temperature, thereby preventing deformation of the first and second reading sensors 9 and 11.

Moreover, since the first and second reading sensors 9 and 11 are supported at positions adjustable also in the sub-scanning direction, the positions of the first and second reading sensors 9 and 11 can be adjusted after the first and second reading sensors 9 and 11 are mounted to the base part 31.

Further, in the present embodiment, since the base part 31 rotatably supporting the first and second sensors 9 and 11 in upward and downward directions, the second springs 43 located between the base part 31 and each of the first and second reading sensors 9 and 11 so as to urge the first and second reading sensors 9 and 11 toward the base part 31 (rotational direction), and the adjusting screws 45 pressing the first and second reading sensors 9 and 11 in the upward or downward direction against the urging force, a pint adjustment can be performed by rotating the first and second reading sensors 9 and 11 by operating the adjusting screws 45 even after the first and second reading sensors 9 and 11 are mounted to the base part 31.

It should be noted that the present invention is not limited to the specifically disclosed embodiments, and variations and modifications may be made without departing from the scope of the present invention. Furthermore, although image reading is performed by dividing the original document into the center portion and the side portions by reading the first and second reading sensors 11 and 9 that are located in a staggered arrangement in the present embodiment, the present invention is not limited to such an arrangement, and each of the first and second reading sensors 9 and 11 may be located oblique to the reading surface and so as to read the center portion and the side portions at the same time.

As mentioned above, the image reading apparatus and the image forming apparatus according to the present invention has effects that an image quality can be improved with a simple structure. Thus, the present invention is applicable to image forming apparatuses such as a copy machine, a printer, a facsimile machine, etc., and an image reading apparatus mounted to such an image forming apparatus.

The present invention is not limited to the specifically disclosed embodiments, and variations and modifications may be made without departing from the scope of the present invention.

The present application is based on Japanese priority applications No. 2003-414202 filed Dec. 12, 2003 and No. 2004-312734 filed Oct. 27, 2004, the entire contents of which are hereby incorporated herein by reference.

What is claimed is:

1. An image reading apparatus for converting an image of an original document into image data, the image reading apparatus comprising:
a plurality of reading sensors each of which extends in a main scanning direction and separated from each other in the main scanning direction so as to be located in a staggered arrangement in which a part of one of the reading sensors in the longitudinal direction faces a part of adjacent one of the reading sensors in a sub-scanning direction perpendicular to the main scanning direction;
a first connection member provided to the part of one of the reading sensors facing the part of the adjacent one of the reading sensors, the first connection member protruding toward the adjacent one of the reading sensors;
a second connection member provided to the part of the adjacent one of the reading sensors facing the part of the one of the reading sensors, the second connection member protruding toward the one of the reading sensors, wherein said first connection member and said second connection member are brought into contact with each other by being urged by a first urging member.

2. The image reading apparatus as claimed in claim 1, wherein said first connection member and said second connection member are integrated with respective one of the reading sensors.

3. The image reading apparatus as claimed in claim 1, wherein said first connection member and said second connection member are fixed to respective one of the reading sensors by a fixing means.

4. The image reading apparatus as claimed in claim 1, wherein a position at which said first connection member and said second connection member are in contact with each other coincides with a boundary line between reading regions of adjacent ones of the reading sensors.

5. The image reading apparatus as claimed in claim 1, wherein one of said first and second connection members has a cylindrical member that contacts with a contact and press part of the other of said first and second connection members.

6. The image reading apparatus as claimed in claim 1, further comprising:
a base part that supports said reading sensors; and
a plurality of support parts that connect said reading sensors with said base part, wherein said support parts rotatably support said reading sensors relative to said base part so that positions of said reading sensors are adjustable in both the main scanning direction and the sub-scanning direction.

7. The image reading apparatus as claimed in claim 1, further comprising:
a base part rotatably supporting said reading sensors;
a plurality of second urging members that urge said reading sensors toward said base part; and
adjusting members that press said reading sensors against urging forces of said second urging members so as to adjust positions of said reading sensors.

8. An image forming apparatus comprising:
an image forming mechanism that forms an image on a recording medium in accordance with image data supplied thereto; and
an image reading apparatus for converting an image of an original document into the image data,
wherein said image reading apparatus including:
a plurality of reading sensors each of which extends in a main scanning direction and separated from each other in the main scanning direction so as to be located in a staggered arrangement in which a part of one of the reading sensors in the longitudinal direction faces a part of adjacent one of the reading sensors in a sub-scanning direction perpendicular to the main scanning direction;
a first connection member provided to the part of one of the reading sensors facing the part of the adjacent one of the reading sensors, the first connection member protruding toward the adjacent one of the reading sensors;
a second connection member provided to the part of the adjacent one of the reading sensors facing the part of the one of the reading sensors, the second connection member protruding toward the one of the reading sensors, wherein said first connection member and said second connection member are brought into contact with each other by being urged by a first urging member.

9. The image forming apparatus as claimed in claim 8, wherein said first connection member and said second connection member are integrated with respective one of the reading sensors.

10. The image forming apparatus as claimed in claim 8, wherein said first connection member and said second connection member are fixed to respective one of the reading sensors by a fixing means.

11. The image forming apparatus as claimed in claim 8, wherein a position at which said first connection member and said second connection member are in contact with each other coincides with a boundary line between reading regions of adjacent ones of the reading sensors.

12. The image forming apparatus as claimed in claim 8, wherein one of said first and second connection members has a cylindrical member that contacts with a contact and press part of the other of said first and second connection members.

13. The image forming apparatus as claimed in claim 8, further comprising:
a base part that supports said reading sensors; and
a plurality of support parts that connect said reading sensors with said base part, wherein said support parts rotatably support said reading sensors relative to said base part so that positions of said reading sensors are adjustable in both the main scanning direction and the sub-scanning direction.

14. The image forming apparatus as claimed in claim 8, further comprising:
a base part rotatably supporting said reading sensors;
a plurality of second urging members that urge said reading sensors toward said base part; and
adjusting members that press said reading sensors against urging forces of said second urging members so as to adjust positions of said reading sensors.

* * * * *